(12) United States Patent
Su

(10) Patent No.: US 8,531,826 B2
(45) Date of Patent: Sep. 10, 2013

(54) DISPLAY SUPPORTING STRUCTURE, MANUFACTURE METHOD THEREOF AND DISPLAY DEVICE HAVING THE DISPLAY SUPPORTING STRUCTURE

(75) Inventor: Yung-Chun Su, Taipei County (TW)

(73) Assignee: Qisda Corporation, Taoyuan County (TW)

(*) Notice: Subject to any disclaimer, the term of this patent is extended or adjusted under 35 U.S.C. 154(b) by 380 days.

(21) Appl. No.: 12/728,182

(22) Filed: Mar. 19, 2010

(65) Prior Publication Data

US 2010/0238617 A1 Sep. 23, 2010

(30) Foreign Application Priority Data

Mar. 20, 2009 (TW) .............................. 98109235 A

(51) Int. Cl.
*H05K 7/14* (2006.01)

(52) U.S. Cl.
USPC .............. 361/679.22; 361/679.01; 248/309.1; 29/428

(58) Field of Classification Search
USPC ............. 361/679.02, 679.01, 679.22, 679.26, 361/629.27, 679.21; 248/917–924, 309.1, 248/121; 29/428, 458, 525.08
See application file for complete search history.

(56) References Cited

U.S. PATENT DOCUMENTS

| | | | | |
|---|---|---|---|---|
| 6,304,433 | B2 * | 10/2001 | O'Neal et al. | 361/679.27 |
| 6,530,784 | B1 * | 3/2003 | Yim et al. | 439/31 |
| 6,654,068 | B1 * | 11/2003 | Brewington et al. | 348/827 |
| 6,816,361 | B2 * | 11/2004 | Kuo | 361/679.6 |
| 7,047,599 | B2 * | 5/2006 | Oshima et al. | 16/337 |
| 7,414,832 | B2 * | 8/2008 | Wang et al. | 361/679.27 |
| 7,965,344 | B2 * | 6/2011 | Wang et al. | 348/826 |
| 2003/0227746 | A1 * | 12/2003 | Sato | 361/686 |
| 2007/0152125 | A1 * | 7/2007 | Lee | 248/398 |

* cited by examiner

*Primary Examiner* — Jinhee Lee
*Assistant Examiner* — Ingrid Wright

(57) ABSTRACT

The present invention discloses a display supporting structure, a manufacture method thereof, and a display device having the display supporting structure. The display supporting structure accommodates a flat display panel and includes a housing and a connector, wherein the housing includes a first cover and a second cover. The connector is movably coupled with the first housing and the second housing. The first housing and the second housing respectively include a first coupler and a second coupler for accommodating a friction end of the connector. The friction end generates a friction by making contact with inner surfaces of both the first coupler and the second coupler. The friction is used to selectively fix the housing in position.

12 Claims, 9 Drawing Sheets

DISPLAY SUPPORTING STRUCTURE, MANUFACTURE METHOD THEREOF AND DISPLAY DEVICE HAVING THE DISPLAY SUPPORTING STRUCTURE

BACKGROUND OF THE INVENTION

1. Field of the Invention

This invention relates to a display supporting structure, a manufacture method thereof, and a display device having the display supporting structure, and specifically to a plastic display supporting structure, a manufacture method thereof and a display device having the plastic display supporting structure.

2. Description of the Prior Art

The flat display includes a flat display panel for displaying images and an adjustable supporting structure for supporting the flat display panel in a height-adjustable manner. FIG. 1 is a schematic view of a conventional supporting structure 10, wherein the conventional supporting structure 10 includes a base 11 and a hinge structure 12. The hinge structure 12 further includes a panel connector 13 and a base connector 14, wherein the panel connector 13 and the base connector 14 are connected to a display panel (not illustrated) and the base 11, respectively. The panel connector 13 is rotatably connected to the base connector 14 and thus the panel connector 13 allows the display panel to rotate in an angle.

However, the above-mentioned base 11 and the hinge structure 12 are normally made of metallic material which provides the base 11 and the hinge structure 12 with sufficient strength. However, the use of metallic material also causes a higher raw material cost. Furthermore, the base 11 and the panel connector 13 are originally iron sheets which are processed by for example stamping or bending to have the structures shown in FIG. 1. The higher raw material cost and additional manufacture processes increase the manufacture costs of the conventional adjustable supporting structure 10 as well as the overall production cost of the associated flat display.

SUMMARY OF THE INVENTION

It is an object of the present invention to provide a display supporting structure and a manufacture method thereof, wherein one end of the display supporting structure is rotatably coupled with a display panel.

It is another object of the present invention to provide a manufacture method to manufacture a display supporting structure having a minimized footprint to reduce the space required for accommodating the display supporting structure.

It is yet another object of the present invention to simplify the manufacture process of a display device and reduce the overall cost of a display device having the display supporting structure of the present invention.

The display supporting structure includes a housing, a connector and a stand, wherein the housing further includes a first cover and a second cover for accommodating a flat display panel. The connector is configured to couple the housing with the stand, wherein the connector includes a friction end and a stand coupling end. The housing is disposed on the stand so that the stand is allowed to support the housing including the display panel. The first cover and the second cover of the housing respectively include a first coupler and a second coupler corresponding to each other, wherein the friction end is disposed between the first coupler and the second coupler. The friction end touches against the inner surfaces of the first coupler and the second coupler to generate a friction force for fixing the housing including the display panel. The housing, the connector and the stand are preferably made of plastic materials, wherein the plastic materials includes material having extensibility greater than 5% such as polyvinyl chloride (PVC) or other suitable materials. The first cover and the second cover are produced by injection molding, but is not limited thereto; in different embodiments, the first cover and the second cover can be made by other molding methods. Furthermore, in different embodiments, the housing, the connector and the stand may include metals or other suitable materials.

The friction end of the present embodiment is T-shaped and the second coupler has a corresponding gap, wherein part of the friction end extends from the connector to be disposed in the gap and part of the friction end is disposed within the space between the assembled first coupler and second coupler. The friction end serves as a pivot of the housing when the housing rotates between the first coupler and the second coupler, wherein different sections of the friction end touches against the inner surfaces of the first coupler and the second coupler to generate a friction force. In other words, the friction end positions the housing by rubbing against the inner surfaces the first coupler and the second coupler.

The first coupler and the second coupler include a first friction portion and a second friction portion respectively on the inner surface to contact the friction end of the connector. A lubricant is applied on the friction end, the first friction portion, and the second friction portion to reduce abrasion caused by rubbing. In one embodiment, the second coupler includes a stopper for restricting the rotation of the friction end and positioning the housing due to contact with the connector. The connector includes a trough formed on a top portion of the connector for accommodating the stopper to increase the movable range of the stopper. The stopper is connected to the housing and thus the trough can be used to adjust the movable range of the stopper or the rotatable range of the housing. In different embodiments, the stopper can be formed on the first coupler between the first coupler and the connector and the trough can be formed at the bottom of the connector for accommodating the stopper.

DETAILED DESCRIPTION OF THE PREFERRED EMBODIMENT

The present invention provides a display supporting structure, a manufacture method thereof, and a display device having the display supporting structure. The display supporting structure is used to accommodate or support a flat display panel, wherein the flat display panel is disposed in the display supporting structure or on the display supporting structure. The display supporting structure or the display device of the present invention is disposed on a plane such as a tabletop or other surfaces suitable for the display device to be placed thereon. Furthermore, the display supporting structure has a rotational mechanism for generating torque, wherein an external force applied on the display supporting structure creates torsional frictions among elements of the display supporting structure to allow the display supporting structure to rotate by a corresponding angle.

Figure 1:
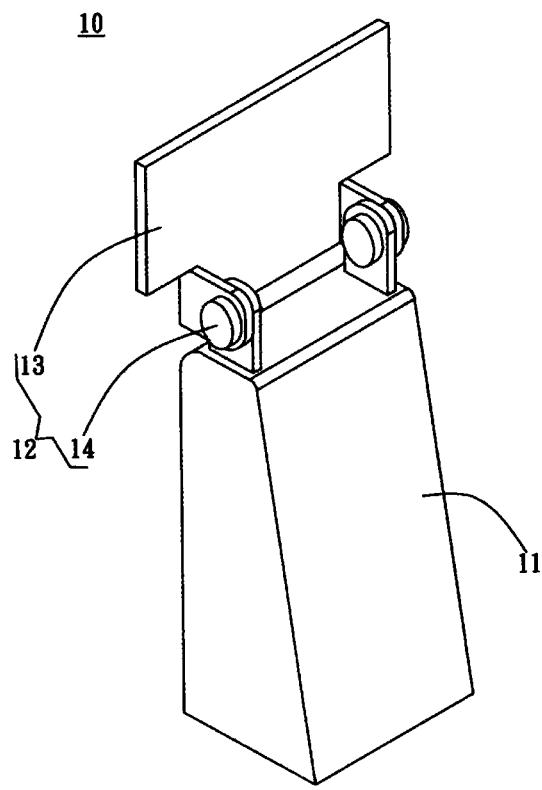
FIG. 1 is a schematic view of a conventional display supporting structure.
Figure 2:
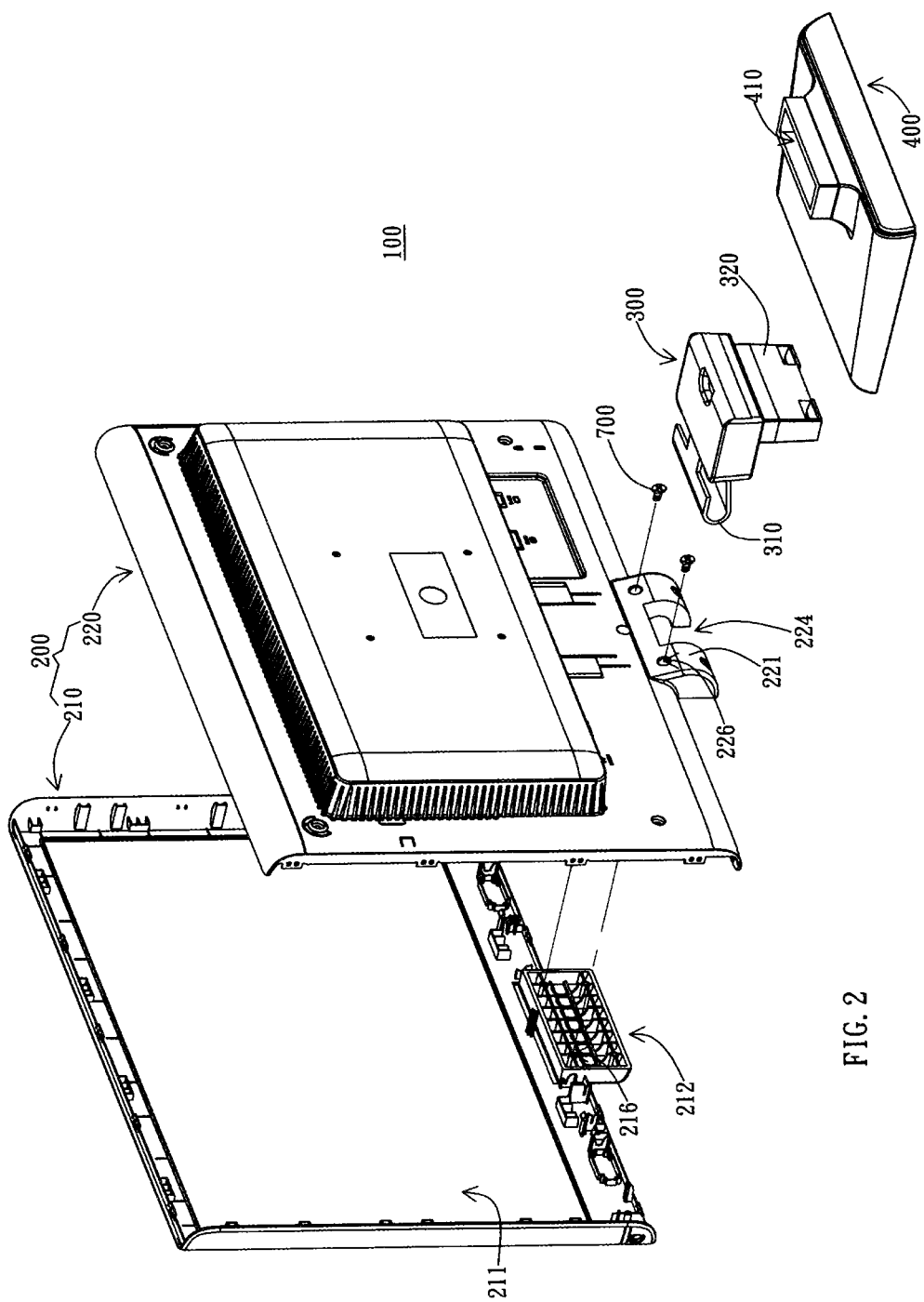
FIG. 2 is an exploded view of the display supporting structure of the present invention.

FIG. 2 is an exploded view of the display supporting structure 100 of the present invention. As FIG. 2 shows, the display supporting structure 100 includes a housing 200, a connector 300 and a stand 400, wherein the housing 200 further includes a first cover 210 and a second cover 220 for accommodating a flat display panel (not illustrated). The first cover 210 includes a display opening 211 to expose an active area of the flat display panel for image display through the display opening. The connector 300 couples the housing 200 with the stand 400. The connector 300 includes a friction end 310 and a stand coupling end 320, wherein the friction end 310 is coupled with the housing 200 and the stand coupling end 320 is coupled with a connector coupling opening 410 of the stand 400. The stand 400 supports the housing 200 disposed thereon and can be disposed on a plane such as a tabletop, but is not limited thereto. In different embodiments, the stand 400 can also be a surface or furniture having the connector coupling opening 410.

As FIG. 2 shows, the first cover 210 and second cover 220 include a first coupler 212 and a corresponding second coupler 221, respectively. The first coupler 212 and the second coupler 221 are formed near edges of the first cover 210 and the second cover 220, respectively. The first coupler 212 and the second coupler 221 are coupled with the friction end 310 which is disposed between the first coupler 212 and the second coupler 221. In the present embodiment, the friction end 310 contacts the inner surfaces of the first coupler 212 and the second coupler 221. When the external force is exerted on the housing 200 to rotate the housing 200 by an angle with respect to the friction end 310, the inner surfaces of the first coupler 212 and the second coupler 221 will rub against the friction end 310; Thus, the user can adjust the orientation of the housing 200 according to his or her need by applying appropriate force on the housing 200. The principle of rotation of the housing 200 will be further explained subsequently.

As FIG. 2 shows, the friction end 310 is T-shaped. Part of the friction end 310 extending from the connector 300 is correspondingly disposed in a gap 224 of the second coupler 221 while part of the friction end 310 is disposed in the space between the assembled first coupler 212 and second coupler 221. The friction end 310 can be regarded as a pivot while the housing 200 rotate between the first coupler 212 and the second coupler 221. Different portions of the friction end's 310 surface rub against the inner surfaces of the first coupler 212 and the second coupler 221, respectively, and a friction force is generated between the friction end 310 and the inner surfaces of the first coupler 212 and of the second coupler 221 to position the housing 200.

Furthermore, the first coupler 212 and the second coupler 221 have a plurality of corresponding first apertures 216 and second apertures 226, respectively. A fixing element 700 passes through the first aperture 216 and the second aperture 226 to couple the first coupler 212 and the second coupler 221. The first aperture 216, the second aperture 226, and the fixing element 700 provide a normal force allowing the friction end 310 to be tightly attached to the first coupler 212 and the second coupler 221 to adjust the friction between the friction end 310 and the couplers 212, 221. The fixing element 700 of the present embodiment is a screw while the first aperture 216 and the second aperture 226 are screw apertures but are not limited thereto; in a different embodiment, the fixing element 700 can include clips, bolts, wedges, or other elements that can be used to couple the first coupler 212 with the second coupler 221. Furthermore, the housing 200, the connector 300, and the stand 400 are preferably made of plastic material, wherein the above-mentioned plastic material includes materials with extensibility greater than 5% such as polyvinyl chloride or other suitable materials. In the present embodiment, the first cover 210 and the second cover 220 are made by injection molding, but are not limited thereto; in different embodiments, the housing 200, the connector 300, and the stand 400 can includes metal or other materials.

Figure 3:
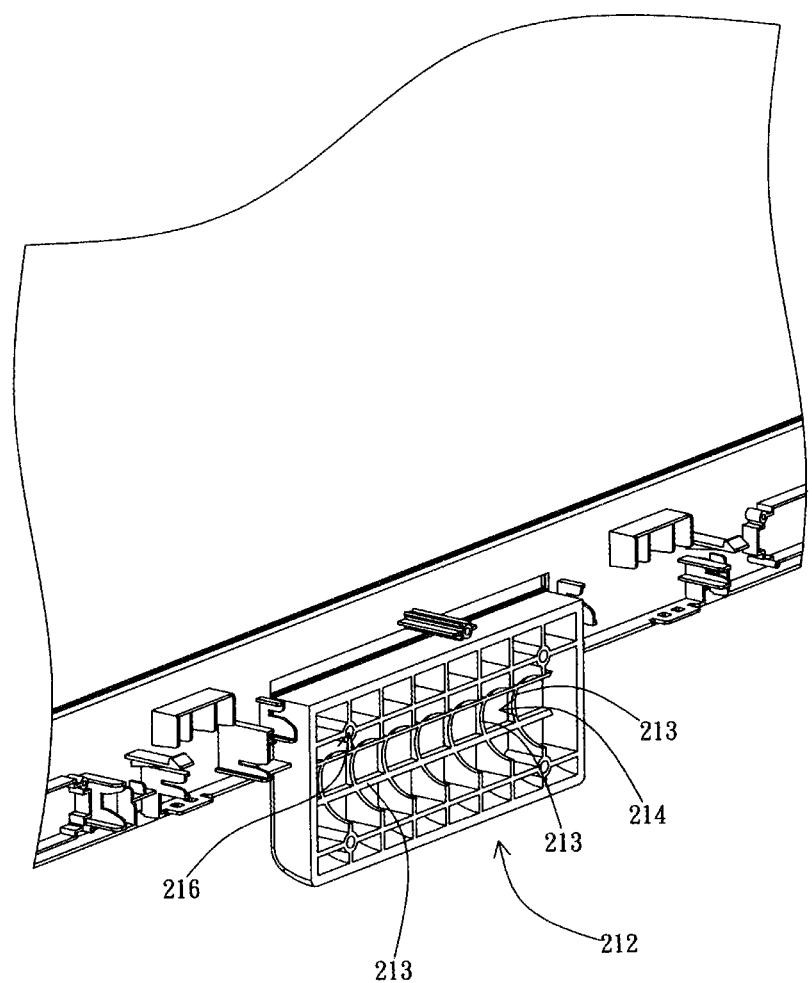
FIG. 3 is an enlarged partial view illustrating the inner surface of the first coupler of the present invention.

FIG. 3 is an enlarged partial view illustrating the inner surface of the first coupler 212 of the present invention, wherein the first coupler 212 includes a plurality of first friction portions 213 disposed on the inner surface of the first coupler 212. The first friction portion 213 of the first coupler 212 is curved to correspond to the shape of the friction end 310. The friction end 310 of the connector 300 touches against the first friction portion 213. In the present embodiment, a lubricant (not illustrated) is applied on the inner surface of first coupler 212 or the outer surface of the first friction portion 213. In other words, the lubricant is disposed between the first friction portion 213 and the friction end 310 to adjust the friction between the first friction portion 213 and the friction end 310 to reduce the abrasion caused by the friction between the first friction portion 213 and the friction end 310. The lubricant of the present embodiment includes mineral base oil and synthetic base oil, but is not limited thereto. The lubricant can also include other substances capable of providing fast machinery running-in at starting-up and wear-resistant effect. Furthermore, the width of the first friction portion 213 is preferably 3 mm, but is not limited thereto; in different embodiments, the width of the first friction portion 213 can be adjusted to conform with the friction requirement between the first friction portion 213 and the friction end 310. The first coupler 212 further includes a plurality of first accommodating portion 214 formed in the first coupler 212 and between the first friction portion 213. The first accommodating portion 214 is configured to accommodate the lubricant. The dimension of the first accommodating portion 214 can be adjusted in accordance with the width of the first friction portion 213.

Figure 4:
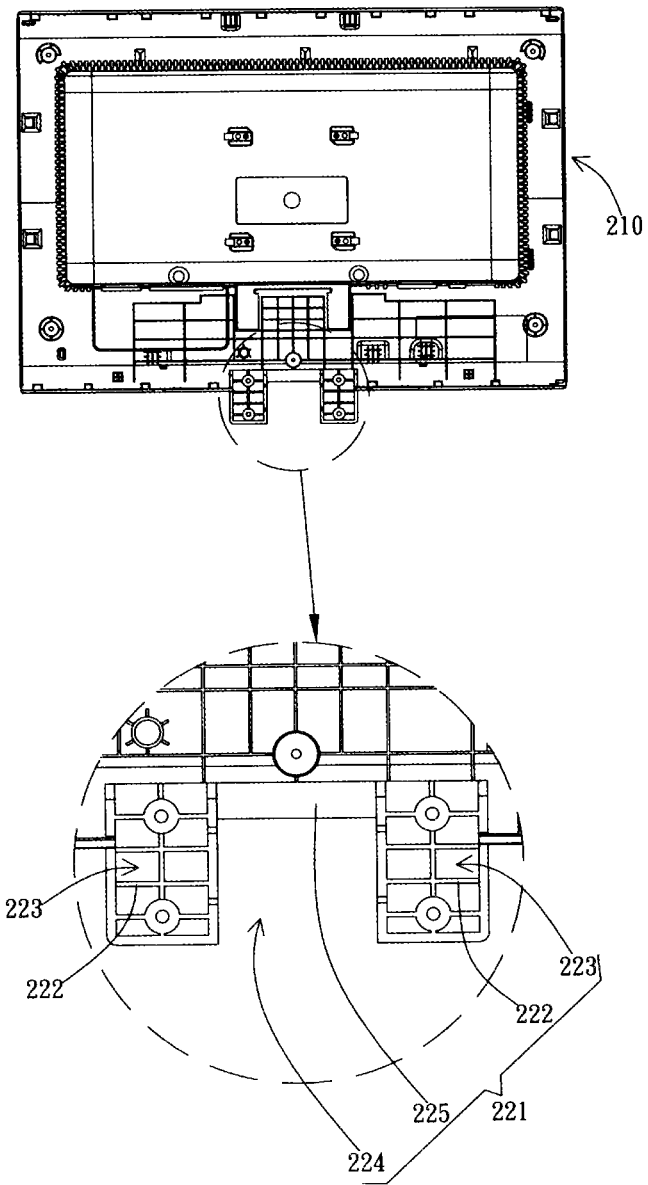
FIG. 4 is an enlarged view illustrating the inner surface of the second coupler of the present invention.

FIG. 4 is an enlarged view illustrating the inner surface of the second coupler 221 of the present invention. The inner surface of the second coupler 221 includes a plurality of second friction portions 222 and a plurality of second accommodating portions 223, wherein the second friction portion 222 and the second accommodating portion 223 are substantially functionally identical to the first friction portion and the first accommodating portion, respectively and thus will not be elaborated again. In the embodiments illustrated in FIG. 3 and FIG. 4, the first friction portion 213 of the first coupler 212 and the second friction portion 222 of the second coupler 222 are making contact with the first coupler 212 and the second coupler 213, respectively. Furthermore, the lubricant is applied onto the second friction portion 222 and into the second accommodating portion 223. The lubricant is configured to adjust the friction between the second friction portion 222 and the friction end 310 so as to reduce the abrasion caused by friction or to adjust the rotating speed of the housing 200 when an external force is applied. Furthermore, the second coupler 221 further includes a gap 224 and a stopper 225. The gap 224 allows the friction end 310 to pass through and then contact the second friction portion 222. The stopper 225 is used to limit the rotation of the friction end and fix the housing in place; in other words, the stopper 225 limits the maximum rotation angle of the housing. Furthermore, in different embodiments, the housing and the display panel disposed therein have different dimensions and weights and thus the friction required for supporting the housing should be adjusted accordingly. For this reason, the surface area of the friction end and the contact area between the friction end and the first coupler or the second coupler 221 should be adjusted according to the friction requirement mentioned above.

Figure 5:
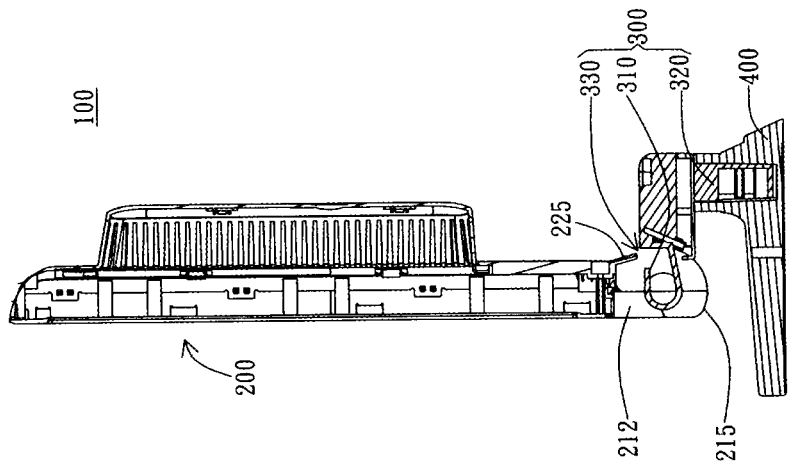
FIG. 5 is a side view of the display supporting structure of the present invention.

FIG. 5 is a side view of the display supporting structure 100 of the present invention. As FIG. 5 shows, the stopper 225 makes contact with the friction end 310 to stop further rotation of the housing 200. Furthermore, the bottom portion 215 of the first coupler 212 can push against the bottom of the friction end 310 the connector 300 to restrict further rotation of the housing. The first coupler 212 and the second coupler 222 can be used to limit the rotation angle of the housing 200 relative to the connector 300. A rotation angle 500 exists between the first coupler 212 and the connector 300 and the rotation angle 500 represents the rotation range of the friction end 310. In other words, the rotation angle 500 between the stopper 225 and the bottom portion 215 of the first coupler 212 represents the maximum rotation range of the housing 200. In the embodiment illustrated in FIG. 5, the rotation angle 500 is substantially 20°, but is not limited thereto; in different embodiments, the rotation angle 500 can be adjusted by changing the length of the bottom portion 215 of the first coupler 212. Furthermore, in the embodiment illustrated in FIG. 5, the connector 300 is substantially right-angled which can keep the housing 200 closest to the stand 400 and reduce the required space for the stand 400, but is not limited thereto.

Figure 6:
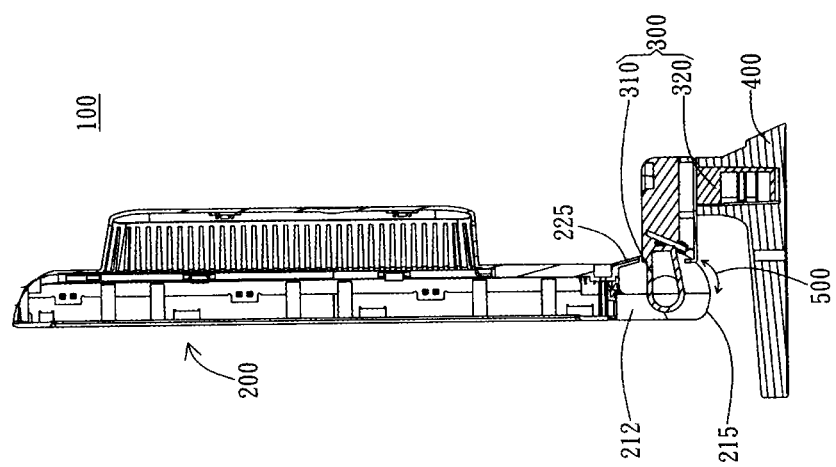
FIG. 6 illustrates a modification of the display supporting structure in FIG. 5.

FIG. 6 illustrates a modification of the display supporting structure in FIG. 5. As FIG. 6 shows, the connector 300 includes a trough 330 formed on the upper surface of the connector 300 for accommodating part of the stopper 225. The stopper 225 of the present embodiment passes through the trough 330 and may contact the inner surface of the connector 300. Thus, the inner surface of the connector 300 can be used to restrict the movement of the stopper 225 or restrict the rotation of the housing 200. Furthermore, the stopper 225 moves together with the housing 200 and thus the trough 330 can be used to adjust the movement range of the stopper 225 or the housing 200. In the embodiment illustrated in FIG. 6, the stopper 225 is a protrusion extending from the housing 200, but is not limited thereto. The shape and dimension of the stopper 225 can be adjusted to modulate the movement range mentioned above. In different embodiments, the stopper 225 can be formed on the bottom of the first coupler 212 and between the first coupler 212 and the connector 300, while the trough 330 is formed at the bottom of the connector 300 to correspondingly accommodate the stopper 225.

Figure 7:
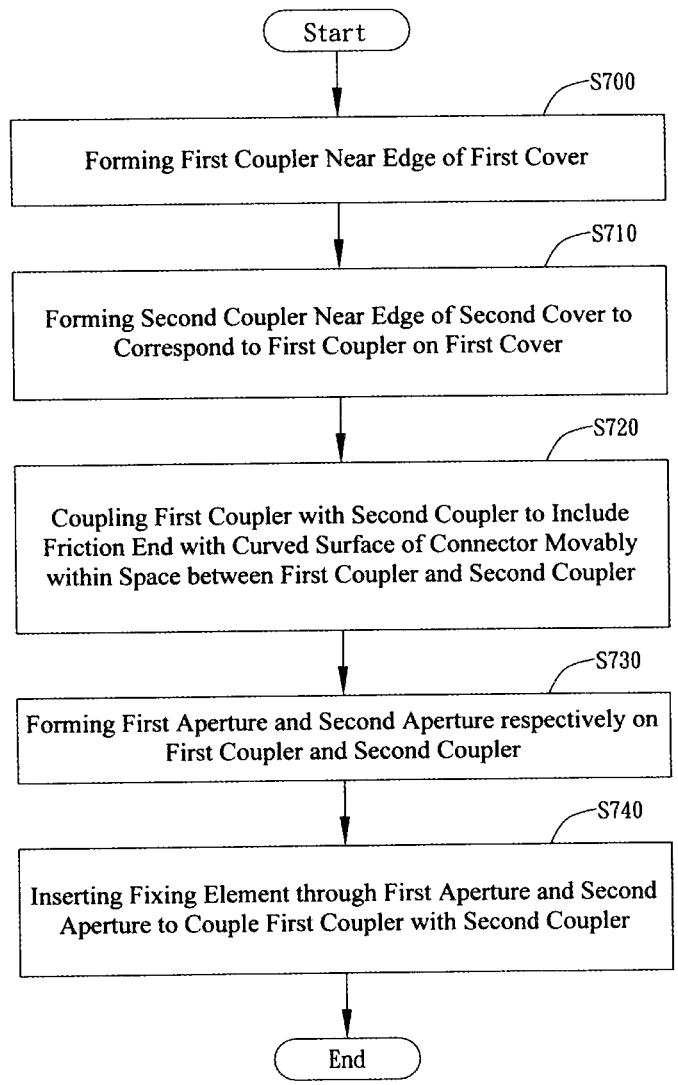
FIG. 7 is a flow chart of the manufacture method of the display supporting structure of the present invention.

FIG. 7 is a flow chart of the manufacture method of the display supporting structure of the present invention. As FIG. 7 shows, the manufacture method of the present invention includes step S700 of forming a first coupler near an edge of a first cover and step S710 of forming a second coupler near an edge of the second cover to correspond to the first coupler on the first cover. The first cover and the second cover are assembled to accommodate a display panel. The display panel includes a liquid crystal display panel, an organic light emitting diode panel or other flat display panels. The first coupler and the second coupler are coupled to accommodate a friction end of a connector. The first coupler of the present embodiment is disposed at the middle of the edge of the first cover, but is not limited thereto; in different embodiments, the first coupler and the second coupler can be disposed respectively at other locations of the edges of the first cover and the second cover. Furthermore, a space exists between the first coupler and the second coupler, wherein the dimension of the space corresponds to that of the friction end for accommodating the friction end.

Step S720 includes coupling the first coupler with the second coupler to include a friction end with a curved surface of the connector movably within the space between the first coupler and the second coupler. The friction end rubs against the inner surface of the first coupler and the second coupler when the housing rotates to provide necessary friction to fix the housing in position. The manufacture method of the display supporting structure further includes step S730 of forming a first aperture and a second aperture respectively on the first coupler and the second coupler and step S740 of inserting a fixing element through the first aperture and the second aperture to couple the first coupler with the second coupler. In this way, the fixing element provides a normal force to allow the friction end to push firmly against the inner surfaces of the first coupler and the second coupler and increases the friction between the friction end and the couplers. Furthermore, the fixing element of the present embodiment includes a screw while the first aperture and the second aperture are the corresponding tapped holes, but are not limited thereto; in different embodiments, the fixed element may include a clip, a bolt, a wedge, or other elements that can be used to couple the first coupler together with the second coupler.

Figure 8:
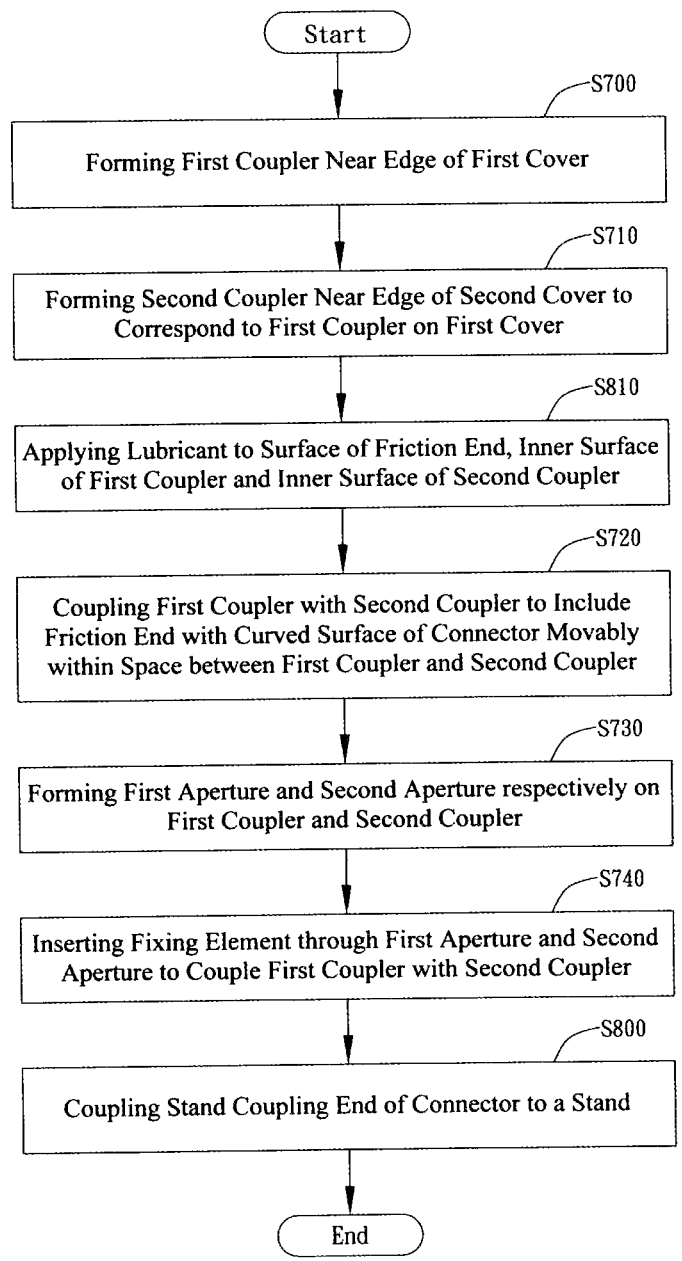
FIG. 8 is a flow chart illustrating another embodiment of the manufacture method of the display supporting structure of the present invention.

FIG. 8 is a flow chart illustrating another embodiment of the manufacture method of the present invention which further includes step S800 of coupling a stand coupling end of the connector to a stand. The stand of the present embodiment includes a connector coupling opening for coupling with the stand coupling end of the connector. The stand couples with the connector which is connected to the housing and is placed on a suitable location such as table top, but is not limited thereto; in different embodiments, the stand can itself be tables, cabinets or other furniture which can be coupled with the connector. The manufacture method of the display supporting structure further includes step S810 of applying a lubricant to the surface of the friction end, the inner surface of the first coupler and the inner surface of the second coupler, wherein the lubricant is substantially applied onto the contact surfaces between the friction end and the inner surfaces of the couplers.

Figure 9:
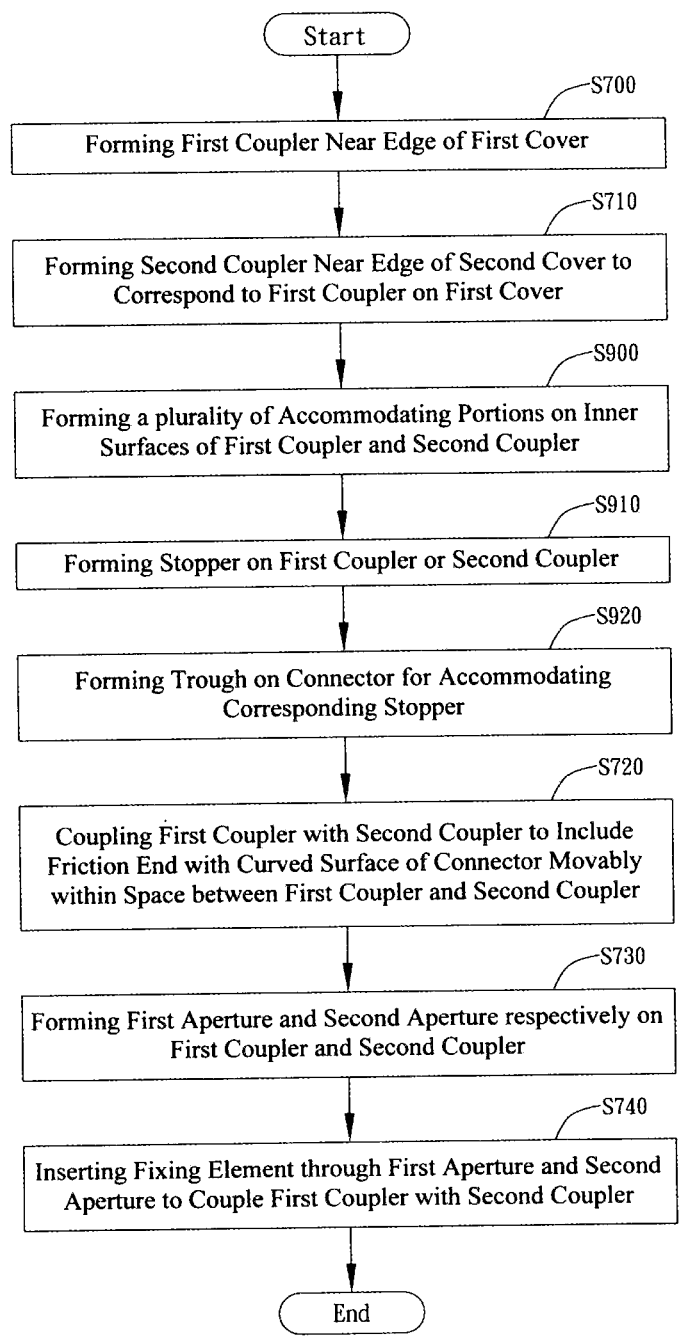
FIG. 9 is a modification of the manufacture method illustrated in FIG. 8.

FIG. 9 is a modification of the manufacture method illustrated in FIG. 8. In the present embodiment, the manufacture method further includes step S900 of forming a plurality of accommodating portions on the inner surfaces of the first coupler and the second coupler. The accommodating portion is a space for accommodating the lubricant. Furthermore, the contact area between the friction end and the couplers are inversely proportional to the number and dimension of the accommodating portions, wherein the number and dimension of the accommodating portions can be adjusted according to the required friction between the couplers and the friction end. Step S910 includes forming a stopper on the first coupler or the second coupler, wherein the stopper of the present embodiment is formed on the second coupler for restricting the movement of the second coupler (or housing). In the present embodiment, the stopper is a protrusion extending from the second coupler, but is not limited thereto. The dimension and the shape of the stopper can be adjusted to modulate the distance between the stopper and the connector as well as the rotatable range of the housing. Step S920 includes forming a trough on the connector for accommodating the corresponding stopper. In the present embodiment, the stopper can pass through the trough and contact the inner surface of the connector. The second coupler moves together with the housing and therefore the inner surface of the connector can be used to restrict the rotation of the housing.

Figure 10:
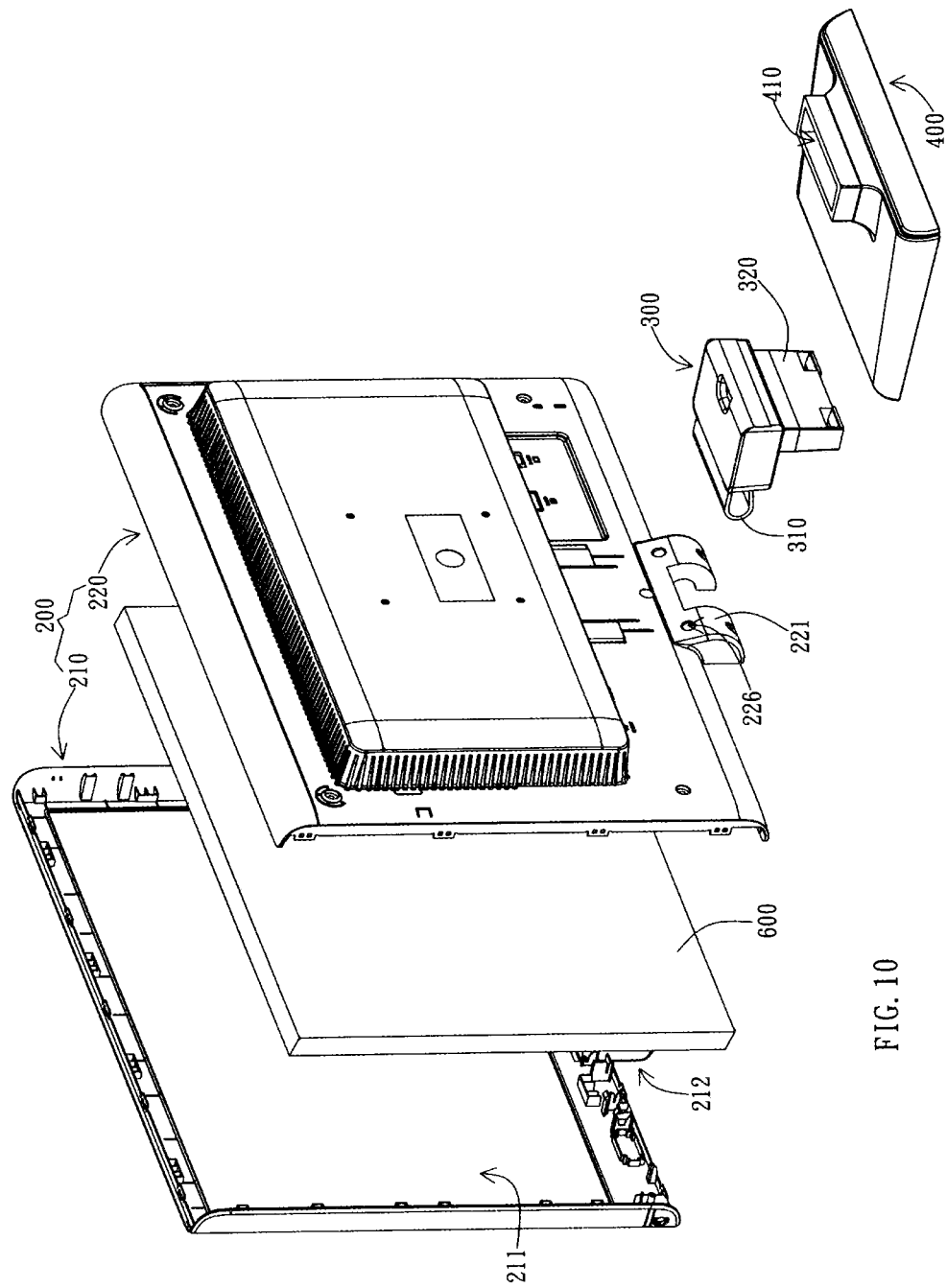
FIG. 10 is an exploded view of a display device having the display supporting structure of the present invention.

FIG. 10 is an exploded view of a display device having the display supporting structure of the present invention. In the present embodiment, the display device includes a display panel 600, a housing 200, a connector 300 and a stand 400. The housing includes a first cover 210 and a second cover 220, wherein the display pane 600 is disposed between the first cover 210 and the second cover 220. The display panel 600 illustrated in FIG. 10 is a liquid crystal display panel, but is not limited thereto; in different embodiments, the display panel 600 may include an organic light emitting diode display panel or other suitable flat display panels. Furthermore, the contact area between friction end 310 and the first coupler 212 and the second coupler 221 is directly proportional to the dimensions of the display panel 600. In other words, the normal force generated from the friction between the friction end 310 and couplers 212, 221 should be adjusted according to the dimension and weight of the display panel.

The above is a detailed description of the particular embodiment of the invention which is not intended to limit the invention to the embodiment described. It is recognized that modifications within the scope of the invention will occur to a person skilled in the art. Such modifications and equivalents of the invention are intended for inclusion within the scope of this invention.

What is claimed is:

1. A display supporting structure, comprising:
a housing including:
a first cover including a first coupler disposed near an edge of the first cover; and
a second cover for correspondingly coupling with the first cover, the second cover including a second coupler disposed near an edge of the second cover corresponding to the first coupler, wherein the first coupler and the second coupler are combined to form an inner space therebetween;
a connector including a friction end with a curved surface, wherein the friction end is movably disposed in the inner space and contacts inner surfaces of the first coupler and the second coupler; and
a stand;
wherein the first coupler and the second coupler respectively include a first friction portion and a second friction portion, the first friction portion and the second friction portion are disposed on inner surfaces of the first coupler and the second coupler to substantially surround the space and contact the friction end of the connector;
wherein the second coupler includes a stopper, the connector further includes a trough accommodating a portion of the stopper, wherein the stopper is restricted to rotate within an angle in the trough;
wherein the connector further includes a stand coupling end, and the stand coupling end is substantially perpendicular to the friction end;
wherein the connector and the stand respectively include a stand coupling end and a connector coupling opening corresponding to each other; and
wherein the stand coupling end is substantially perpendicular to the friction end.

2. The display supporting structure of claim 1, wherein at least part of the connector is made of a plastic material.

3. The display supporting structure of claim 1, further comprising a lubricant disposed on the surface of the friction end, the inner surface of the first coupler, and the inner surface of the second coupler.

4. The display supporting structure of claim 3, wherein the first coupler and the second coupler respectively include a first accommodating portion and a second accommodating portion formed respectively on the inner surface of the first coupler and the inner surface of the second coupler to accommodate the lubricant.

5. The display supporting structure of claim 1, further comprising at least one fixing element, wherein the first coupler and the second coupler respectively include a first aperture and a second aperture corresponding to each other, the fixing element passes through the first aperture and the second aperture to couple the first coupler with the second coupler.

6. A display device, comprising:
a display panel;
a housing including:
a first cover including a first coupler disposed near an edge of the first cover; and
a second cover for correspondingly coupling with the first cover to allow the display panel to be sandwiched, the second cover includes a second coupler disposed near an edge of the second cover corresponding to the first coupler, an inner space is formed between the first coupler and the second coupler; and
a connector including a friction end with a curved surface, wherein the friction end is movably disposed in the inner space to contact inner surfaces of the first coupler and the second coupler; wherein at least part of the connector is made of plastic material;
wherein the connector further includes a stand coupling end, and the stand coupling end is substantially perpendicular to the friction end.

7. A manufacture method of a display supporting structure having plastic material, comprising:
forming a first coupler near an edge of a first cover;
forming a second coupler near an edge of the a second cover to correspondingly be combined with the first coupler to form an inner space between the first coupler and the second coupler;
coupling the first coupler with the second coupler to form an inner space to accommodate a friction end with a curved surface of a connector movably within the inner space; and
coupling a stand coupling end of the connector to a stand, wherein the stand coupling end is substantially perpendicular to the friction end.

8. The manufacture method of claim 7, further comprising selectively coupling a stand coupling end of the connector to a stand.

9. The manufacture method of claim 7, further comprising applying a lubricant to the surface of the friction end, an inner surface of the first coupler, and an inner surface of the second coupler.

10. The manufacture method of claim 9, further comprising forming a plurality of accommodating portions on the inner surfaces of the first coupler and the second coupler for accommodating the lubricant.

11. The manufacture method of claim 7, wherein the step of coupling the first coupler with the second coupler includes:
forming a first aperture and a second aperture respectively on the first coupler and the second coupler; and inserting a fixing element through the first aperture and the second aperture to couple the first coupler with the second coupler.

12. The manufacture method of claim 7, further comprising:
forming a trough on the connector;
forming a stopper corresponding to the trough on the first coupler or the second coupler; and
disposing the stopper in the trough, wherein the stopper is allowed to rotate in the trough by an angle.

* * * * *